G. W. PRICE.
HORSESHOE ATTACHMENTS.
No. 195,047. Patented Sept. 11, 1877.
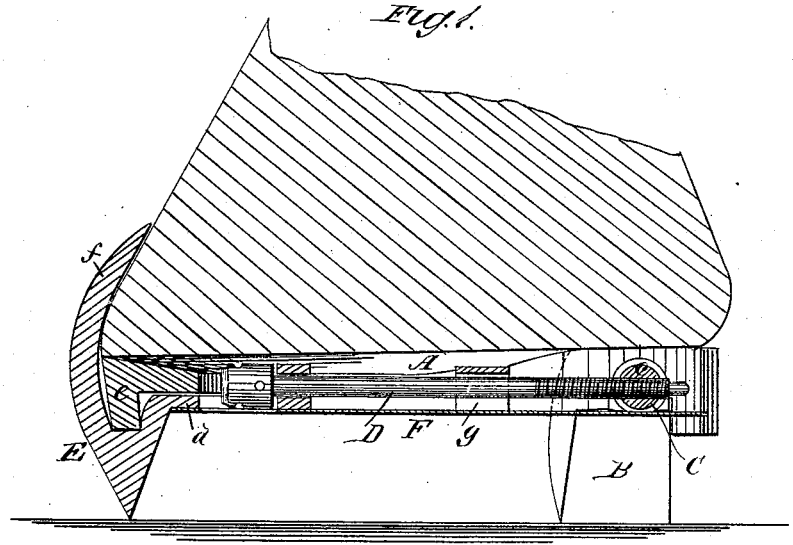
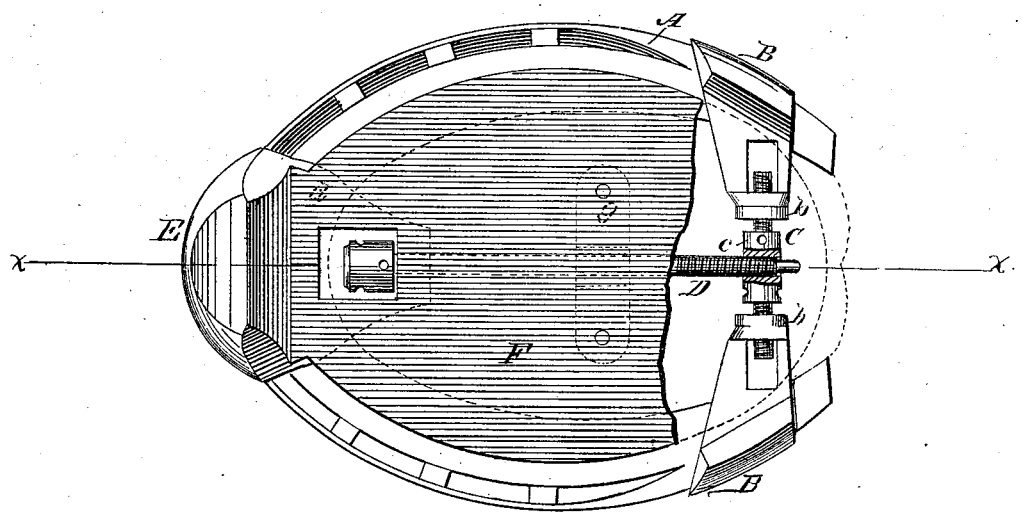
WITNESSES:
Francis McArdle
J. H. Scarborough
INVENTOR:
G. W. Price.
BY Munn & Co
ATTORNEYS.
N. PETERS, PHOTO-LITHOGRAPHER, WASHINGTON, D. C.

UNITED STATES PATENT OFFICE.

GEORGE W. PRICE, OF LAKELAND, ASSIGNOR TO HIMSELF AND WILLIAM H. SANFORD, OF HAUPPAUGE, NEW YORK.

IMPROVEMENT IN HORSESHOE ATTACHMENTS.

Specification forming part of Letters Patent No. 195,047, dated September 11, 1877; application filed August 3, 1877.

To all whom it may concern:

Be it known that I, GEORGE W. PRICE, of Lakeland, in the county of Suffolk and State of New York, have invented a new and Improved Horseshoe Attachment, of which the following is a specification:

Figure 1 is a vertical section taken on line x x in Fig. 2. Fig. 2 is an inverted plan view with portions broken away to show the construction more clearly.

The object of my invention is to provide calks for horseshoes that may be attached and detached at pleasure, and also to provide a device for preventing balling.

In the drawing, A is an ordinary horseshoe, attached to the horse's hoof in the usual way. B B are calks that are fitted to the horseshoe just in front of the usual heel-calks, and are each provided with an inwardly-projecting arm, at the end of which a nut, b, is formed. They are also provided with a lip that engages the edge of the horseshoe.

C is a screw, having on one end a right-hand and upon the other a left-hand thread, and provided with a central hub, c, which is drilled transversely to receive a rod for turning it. This screw is fitted to the nuts b, and is drilled transversely through the middle and tapped to receive the screw D. This screw passes through an ear formed on an arm, d, extending rearward from the toe-calk E, and its head rests against the ear and is drilled to receive a rod by which it is turned.

The toe-calk E is chambered out to receive the toe-calk e of the ordinary shoe, and a lip, f, is formed on it that extends upward over the toe of the hoof. To the arm d a plate, F, is attached, which is similar in outline to the horseshoe, and is apertured to admit of turning the screw D. A loop, g, is attached to the upper side of the plate F and surrounds the screw D.

The device is attached to the foot of the horse by first placing the calks B upon the heel of the shoe and tightening them by turning the screw C. The screw D is then started in the transverse hole in the hub of the screw C, and the toe-calk E is put in place and the screw D tightened. The calks B and E and plate F are thus firmly secured in place.

The calks of the attachment, being longer and sharper than the calks of an ordinary horseshoe, prevent slipping, and by means of the plate F balling is entirely prevented.

Having thus described my invention, I claim as new and desire to secure by Letters Patent—

The combination of the calks B E, screws C D, and plate F, substantially as shown and described.

GEORGE W. PRICE.

Witnesses:
WILMOT M. SMITH,
EDGERTON KISSAM.